United States Patent [19]

Korek

[11] 4,388,857

[45] Jun. 21, 1983

[54] APPARATUS FOR THE CONTINUOUS COOKING OF WORT

[75] Inventor: Johannes Korek, Wieslock, Fed. Rep. of Germany

[73] Assignee: Kraftanlagen A.G., Heidelberg, Fed. Rep. of Germany

[21] Appl. No.: 247,335

[22] Filed: Mar. 25, 1981

[30] Foreign Application Priority Data

Apr. 1, 1980 [DE] Fed. Rep. of Germany ....... 3012591

[51] Int. Cl.³ ............................................ A23L 1/207
[52] U.S. Cl. ....................................... 99/276; 99/278; 426/29; 426/492; 426/493
[58] Field of Search ....................... 99/276, 277, 277.1, 99/277.2, 278; 426/29, 16, 490, 492, 493, 11, 30; 435/93

[56] References Cited

U.S. PATENT DOCUMENTS

| | | | |
|---|---|---|---|
| 2,775,522 | 12/1956 | Coutts | 99/278 X |
| 3,117,005 | 1/1964 | Coutts | 426/16 |
| 3,535,116 | 10/1970 | Harsanyi | 99/278 X |
| 3,679,431 | 7/1972 | Clayton et al. | 426/29 |
| 3,940,492 | 2/1976 | Ehnstrom | 426/16 |
| 4,009,286 | 2/1977 | Moll et al. | 426/16 X |

FOREIGN PATENT DOCUMENTS 2635026 9/1978 Fed. Rep. of Germany ........ 426/29

OTHER PUBLICATIONS

Julin, V. S., Berger, H., Brauwelt, vol. 119 (1979), No. 15, pp. 492–494.

Primary Examiner—Harvey C. Hornsby
Assistant Examiner—Christine A. Peterson

[57] ABSTRACT

Apparatus for the continuous boiling of wort serving for beer production in a reactor at a temperature increased and a pressure increased during the time of stay in the reactor, which reactor is preceded by a wort preheater heated by wort vapor, and by an outside boiler heated by outside steam, and is followed by at least one expansion stage. The reactor and the at least single expansion stage are followed by at least two evaporation stages, to which wort vapor condensers are connected, to which the wort vapors from their associated evaporation stages are fed, and in which water is heated by the use of the condensate heat, while a wort cooler is connected to the output of the vacuum evaporator.

7 Claims, 1 Drawing Figure

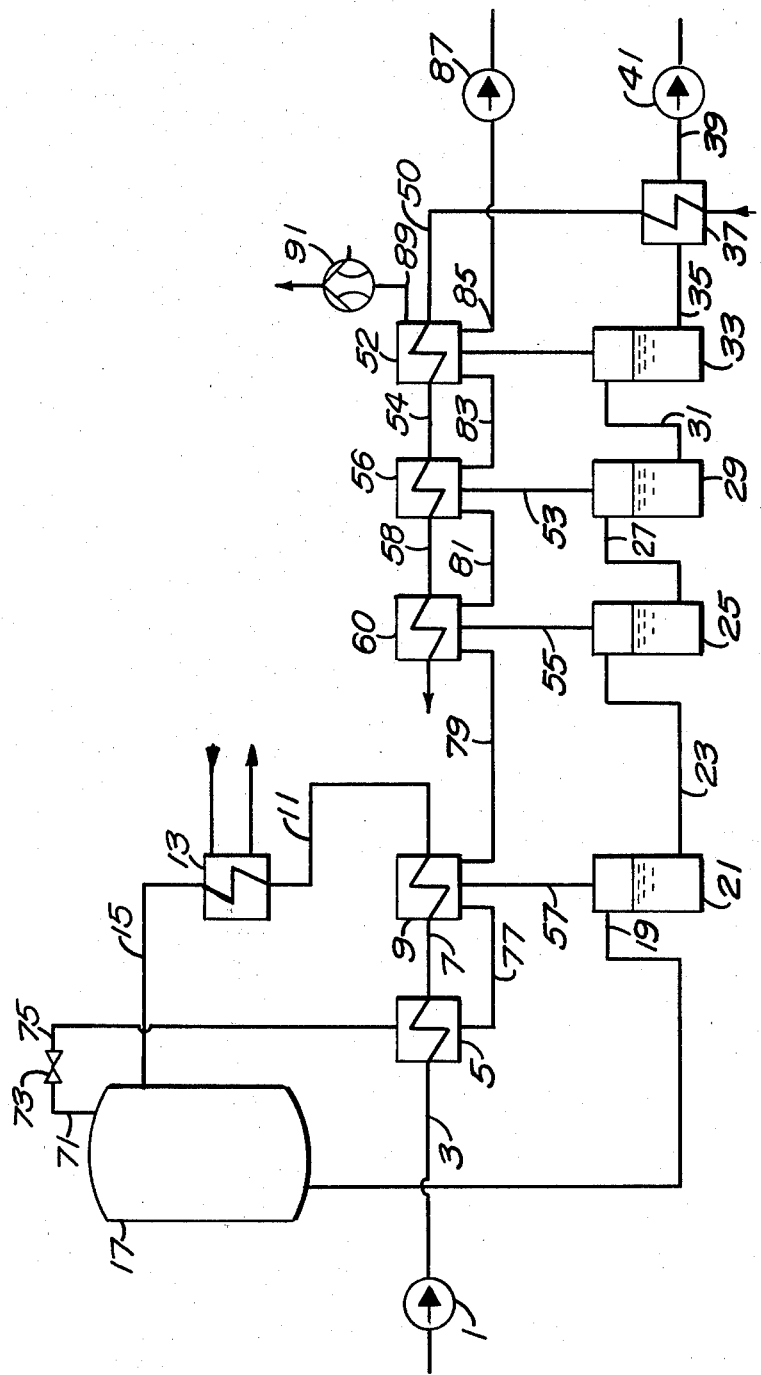

APPARATUS FOR THE CONTINUOUS COOKING OF WORT

BACKGROUND

The invention relates to an apparatus for the continuous cooking of wort used for the production of beer, consisting of a preheater heating the wort with the vapor from the cooking operation, a steam heater supplied with steam from an outside boiler, a reactor in which the heated wort is maintained for a period of time at constant elevated temperature and pressure, and at least one expansion evaporator.

It is already known to heat the hopped wort withdrawn by a pump from the mashing kettle at about 75° C. to a temperature of about 95° C. in a first heat exchanger, to about 115° C. in a second heat exchanger, and lastly in a third to about 140° C. Then the wort is passed through a reactor in the form of a cylindrical tank where it is kept at this last temperature for a certain length of time under a constant pressure of approximately 6 bar. The elevated pressure prevents the wort from boiling up too soon. Then follows a two-stage lowering of the pressure to about 1 bar absolute. The vapor that is released by this abrupt reduction of pressure is used for a regenerative heating of the wort from about 95° to 115° C. in a second heat exchanger. The wort is discharged from this evaporation tank at a temperature of about 120° C. and, in a second evaporation tank connected to the outlet of the first evaporation tank, it is expanded from 1 bar of excess pressure to standard pressure corresponding to a wort temperature of approximately 100° C.

The heat of the wort vapors from the second expansion stage is used to preheat the wort from 75° C. to 95° C. in a first heat exchanger. The third wort heating stage, also in the form of a heat exchanger, is designed for a final wort temperature of about 140° C., and is supplied with direct steam of approximately 7 bar corresponding to 160° C. (*Brauwelt*, Vol. 119, 1979 No. 15, pp. 492–494). This high temperature cooking, continuous wort clarification and wort cooling permits the achievement of an immediate hot separation of sediment and rapid cooling to the pitching temperature.

The coefficient of evaporation is selected between 5 and 6%, and the concentration of the last run of wort and of part of the second wort is omitted. The temperature produced during the reaction period, which is now increased to 140° C., considerably higher than the 100° C. boiling temperatures formerly used in brewing kettles, for a shorter period of time, is necessary in order to achieve an evaporation of at least 7%.

The invention is aimed at considerably reducing the energy requirement and hops consumption in a continuous wort cooking operation of the above-described kind, and at achieving a substantial outgassing of the wort combined with an improvement of quality.

This object is achieved in accordance with the invention in that the reactor and at least one expansion stage is followed by a vacuum evaporator having at least two evaporation stages from which the wort vapors are fed to wort vapor condensers in which water is heated by these vapors for any desired useful purpose, and in that the output of the vacuum evaporator is connected to a wort cooler.

As in the formerly known method, the reaction and the relieving of the pressure on the wort are separate operations, the expansion being performed in a series of evaporators after the reaction has been completed, at which time the wort is still hot and under constant elevated pressure. The method of the invention differs from this principally in that a vacuum evaporator of two or more stages of evaporation follows the reactor and the evaporator. This vacuum evaporator cools the wort in steps down to about 50° C., and at the same time outgasses it, and the vapors from the vacuum evaporators are delivered from each vacuum evaporator to one of a series of vapor condensers connected to one another in tandem, for the purpose of heating brew water flowing through them countercurrently to the wort, or for any other such heating purpose.

Furthermore, a wort cooler follows the last evaporator stage of lowest pressure, and to which cooler preferably brewing water is fed as a cooling medium so that the same simultaneously serves as a preheater for the brewing water. In this manner, evaporation and thereby a cooling of the wort to approximately the temperature of the surroundings is achieved, and the created vapor heat is fully used, preferably for heating the brewing water. The cooling achieved by vacuum evaporation leads to a higher durability and quality of the produced wort. Simultaneously, odors in the environment are reduced, due to the evaporation in the individual stages of the vacuum evaporator.

By maintaining the temperature level that has proved successful for the boiling in brewing vats with external boilers surprisingly the possibility arises for simply fixing the evaporation at a rate of from 8 to 14% and for reliably eliminating undesirable hop oil components and taste carriers, without letting smell-intensive materials into the environment.

According to a further development of the main inventive idea, condensate conduits are used for connecting the condensate chambers of the wort heater and the last stage of highest end temperature for exploiting low temperature heat, and further condensate conduits for the connection of the condensate chambers of the preheater preferably for brew water among themselves, in a series arrangement of such condensate chambers countercurrent to the preheating of the brew water. In this manner, also the pressure of the brew condensate is lowered approximately to the pressure of the environment in steps and the condensate heat is, in addition, used for the exploitation of the low temperature.

Preferably, an evaporation of the wort in the reactor may take place whereby the temperature of the same is slightly lowered. The vapors are fed to the wort preheater and thereby the heat energy used for the boiling process is completely recovered. Preferably, the vapor condensate of the reactor is fed to the condensate chamber of the wort heater to likewise redirect the condensate heat of the same into the process.

To explain the idea of the invention, an embodiment of the apparatus of the invention for the continuous cooking of wort is represented diagrammatically in the drawing and will be explained herewith.

The wort is fed at about 75° C. by the pump 1 into the apparatus and passes successively through pipeline 3 into wort preheater 5, through pipeline 7 to the second wort heater 9, and then via pipeline 11 to the heat exchanger 13 heated with steam from an outside boiler, and lastly through line 15, at a final temperature of approximately 110°–125° C. into the reactor 17. The reactor in this case takes the place of the formerly used brewing kettle. After a period of time in the reactor, the wort passes through line 19 with throttling into evaporator 21 and then via line 23 into the first stage 25 of a vacuum evaporator, via line 27 into the second stage 29 thereof, and finally via line 31 into its third and last stage 33, with throttling and pressure reduction in each to let the pressure off the wort and at the same time cool it down to approximately ambient temperature. The wort leaving the final evaporator stage passes through line 35 into a cooler 37 and via line 39 to the pump 41. The pump 41 delivers the wort from the apparatus of the invention at about 35° C. Brew water is provided as the coolant for the wort; this water entering through the wort cooler 37, is also used for the condensation of the wort vapors in the individual stages of the vacuum evaporator, and for this purpose it is fed countercurrently to the wort from the vapor condenser of lowest pressure to that of highest pressure. Thus, the brew water is fed from the wort cooler 37 through the pipeline 50 to the vapor condenser 52, through pipeline 54 through the vapor condenser 56, and lastly through pipeline 58 through the vapor condenser 60, so as to be used as brew water in the mashing operation. The individual stages of the vacuum evaporator are in this case connected to the corresponding vapor condensers through the vapor lines 51, 53 and 55. The vapor condenser 9 is connected to the evaporator 21 by the vapor line 57 and serves simultaneously as the second wort heater.

In the apparatus shown, the energy of the expanding vapor from the reactor and from the apparatus that follow is returned into the process in the following manner. The hot vapor released by the expansion of the wort passes from the evaporator 21 to the vapor condenser 9, the condensate passes over line 79 through the vapor condenser 60 of the first stage of the vacuum evaporator, over line 81 through the vapor condenser 56 of its second stage, and then finally over line 83 through the vapor condenser 52 of its third and final stage. The condensate pump 87 connected by line 85 to the vapor condenser of lowest pressure of the vacuum evaporator serves for the pumping of the condensate. The removal of the gases from the vapor chambers of all the vapor condensers is represented as an air pump 91 connected by line 89 to the vapor condenser 52 of the third and final stage of lowest pressure 33 of the vacuum evaporator.

For a preliminary evaporation in reactor 17 with a simultaneous slight temperature reduction, vapors from the reactor are removed from the reactor through line 71, shutoff valve 73 and connecting line 75 and fed to the wort preheater 5. The thermal energy used for the cooling is in this manner completely recovered.

The vapor condensate from the wort preheater 5 passes through line 77 into the condensate chamber of the second wort heater 9 in order likewise to make use of the heat of its condensate in the process.

I claim:

1. An apparatus for continuous boiling of wort in beer production, comprising:
a reactor vessel under elevated pressure and at elevated temperature, and having a wort inlet conduit and a wort outlet conduit, a wort preheater in said inlet conduit, a boiler heated by outside heat and placed in said inlet conduit between said wort preheater and said reactor vessel, at least one evaporator in said outlet conduit, a vacuum evaporator with at least two evaporators in said outlet conduit following said at least one evaporator, at least two wort vapor condensers respectively connected to said at least two evaporators for receiving wort vapors therefrom, means for passing brew water, to be used in said beer production, through said at least two condensers and to be heated by the wort vapor condensating in said wort vapor condensers, and a wort cooler in said outlet conduit following said at least two evaporators, for cooling the boiled wort concentrated in said at least two evaporators.

2. An apparatus according to claim 1, in which said wort vapor condensers are arranged in series, and wherein said brew water is fed through said condensers in series in counterflow to the wort vapor condensating in said wort vapor condensers.

3. An apparatus according to claim 2, including a conduit for passing said brew water through said wort cooler as a coolant to be preheated by the wort flowing through said cooler, and said last mentioned conduit passing through said condensers.

4. An apparatus according to any one of claims 1 to 3, comprising a wort afterheater placed in said wort inlet conduit between said wort preheater and said boiler, and conduit means connecting said at least one evaporator with said wort afterheater for passing vapors from said at least one evaporator to said wort afterheater which functions as a condenser.

5. An apparatus according to claim 4, wherein said wort afterheater and said wort condensers have condensate chambers, and means for interconnecting said condensating chambers.

6. An apparatus according to claim 1, comprising conduit means interconnecting said reactor vessel and said wort preheater for conducting vapor from said reactor vessel through said wort preheater to thereby preheat wort in said preheater.

7. An apparatus according to claim 6, wherein said wort preheater has a condensate chamber, and conduit means interconnecting the condensate chambers of said wort preheater and said wort afterheater.

* * * * *